INVENTORS
Clifford L. Muzzey
and Howard Carson
by Spencer Hardman & Fehr
their ATTORNEYS

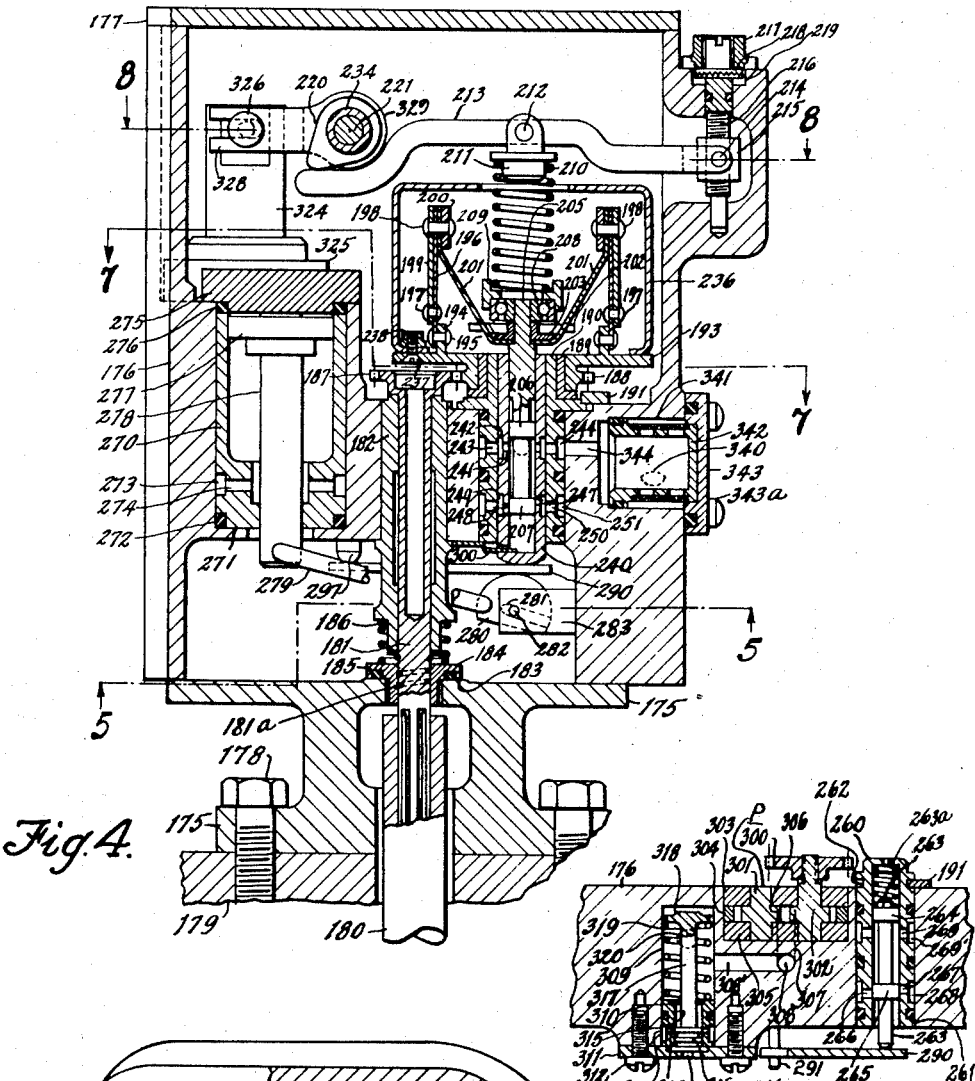
Fig. 4.
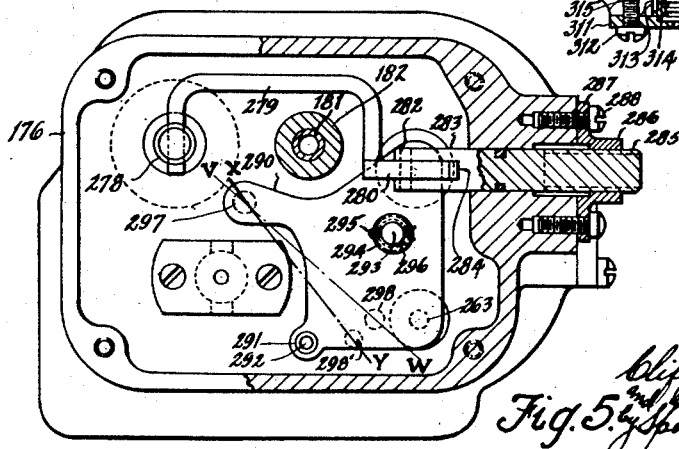
Fig. 5.
Fig. 6.
INVENTORS
Clifford L. Muzzey
and Howard Carson
by Spencer Hardman & John
their ATTORNEYS

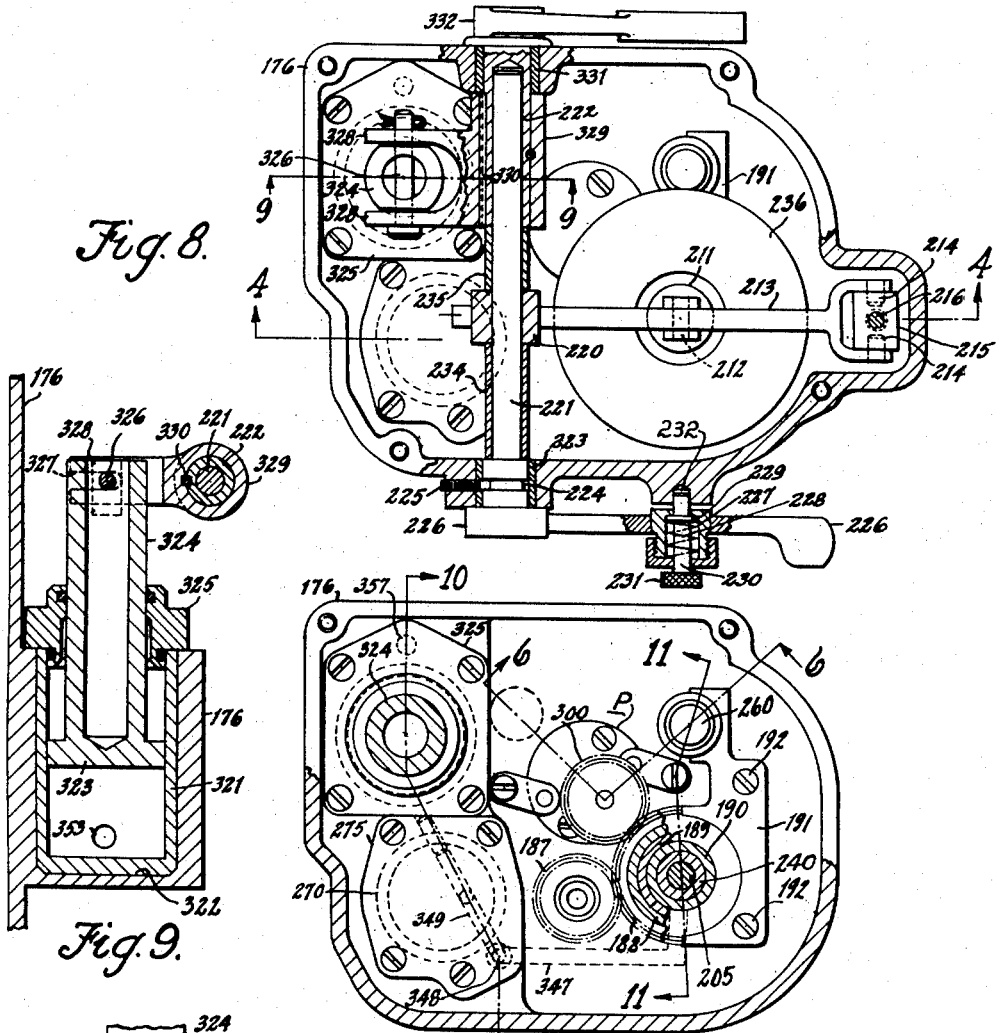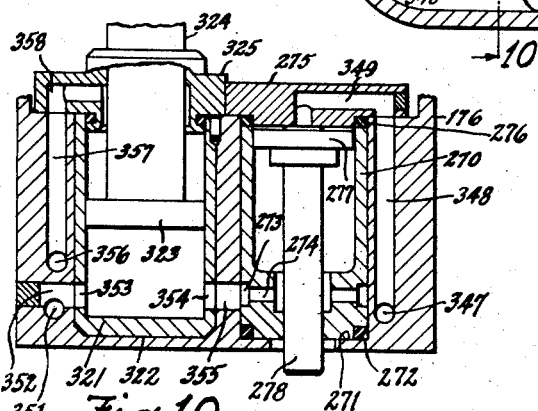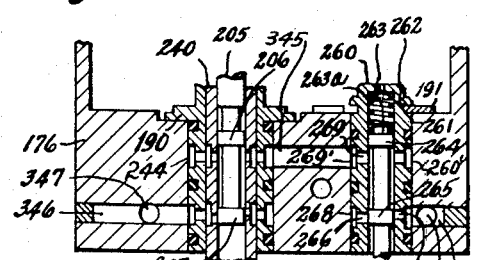

Patented July 24, 1951

2,561,588

UNITED STATES PATENT OFFICE 2,561,588

SPEED RESPONSIVE DEVICE WITH AUTOMATIC FLUID PRESSURE MODIFIER

Clifford L. Muzzey, Dayton, Ohio, and Howard Carson, Cambridge, Mass., assignors to General Motors Corporation, Detroit, Mich., a corporation of Delaware Application May 4, 1946, Serial No. 667,314

9 Claims. (Cl. 264—7)

This invention relates to governors for controlling the speed of a prime mover by controlling the medium which operates it.

An object of the present invention is to provide an improved governor having stability of control. In the disclosed embodiment of the invention this object is accomplished by the use of an hydraulic servo whose piston is connected by a piston rod with a throttle valve or other device which controls the flow of operating medium to the prime mover. The rod side of the piston is subjected to a substantially constant pressure and the other side of the piston, larger in area than the rod side, is subjected to a total pressure which is greater or less than the total pressure on the rod side depending on underspeed or overspeed. The rate of flow of pressure flow into or out of the space in the servo cylinder at the piston side of larger area is caused to be proportional to speed error and to the rate of change of speed error by virtue of the operation of valve connected with said space and operating to control flow rate in proportion to speed error and by virtue of operation of a stabilizer having a cylinder which is connected at one end with said space and having a piston whose rate of displacement is caused to be proportional to the rate of change of speed error.

Further objects and advantages of the present invention will be apparent from the following description, reference being had to the accompanying drawings, wherein a preferred embodiment of the present invention is clearly shown.

In the drawings:

Fig. 4 is a vertical, longitudinal, sectional view on line 4—4 of Fig. 8, of a governor shown in Fig. 1.

Fig. 5 is a sectional view on line 5—5 of Fig. 4.

Fig. 6 is a sectional view on line 6—6 of Fig. 7.

Figs. 7 and 8 are sectional views taken, respectively, on lines 7—7 and 8—8 of Fig. 4.

Fig. 9 is a sectional view on line 9—9 of Fig. 8.

Fig. 10 is a sectional view on line 10—10 of Fig. 7.

Fig. 11 is a sectional view on line 11—11 of Fig. 7.

Figure 12:
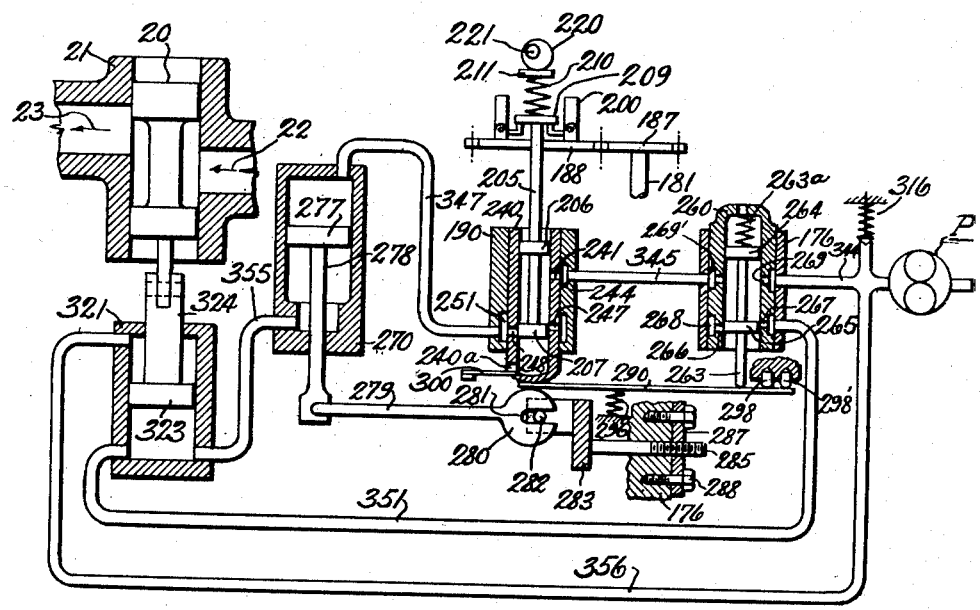

Fig. 12 is an hydraulic circuit diagram of the governor.

Figure 1:
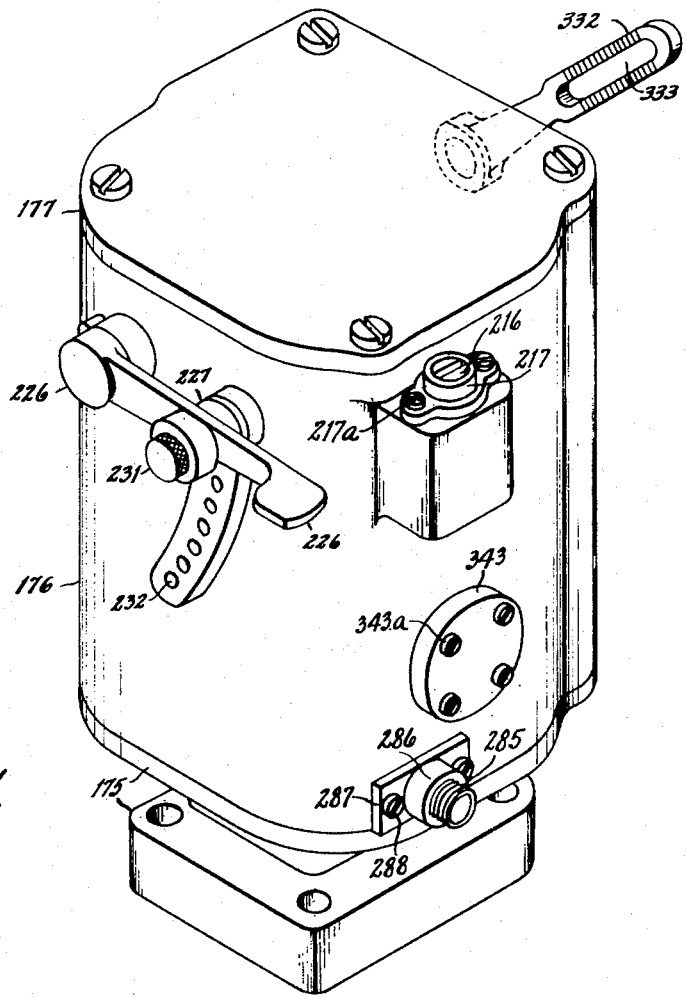
Fig. 1 is a perspective view of governor embodying the invention.

Referring to Fig. 1, the governor unit comprises a base 175, a housing 176 supported by the base, and the cover 177 supported by the housing.

Referring to Fig. 4, the base is attached by screws 178 to the frame 179 of the engine which drives a shaft 180. Shaft 181, splinedly connected with shaft 180, is journaled in a bushing 182 supported by the housing 176. Since the housing contains hydraulic fluid, the upper surface of the base is provided with a flat surface 183 engaged by a neoprene seal ring 185 carried by a bushing 184 through which the shaft 181 extends. A spring 186 confined between the lower end of bushing 182 and the upper end of bushing 184 urges the latter and the ring 185 against the surface 183. Shaft 181 has a spiral groove 181a for receiving oil leaking past the top of bushing 184. The lead of groove 181a is such that it tends to elevate the oil and return it to the reservoir while the shaft 181 is rotated.

Shaft 181 is integral with a gear 187 meshing with a gear 188 provided with a bearing sleeve 189 rotatably supported by a sleeve 190 fixed to the housing 176. Sleeve 190 is retained by a plate 191 (see Fig. 7) attached to the housing by screws 192. Gear 188 provides a plate 193 providing lugs 194 to which rivets 195 attach leaf spring hinges 196 to which rivets 197 and 198 attach a stiffening plate 199 and an additional weight 200. Two rivets 198 also connect the upper ends of the hinged plate 196 to a strap 201. The two branches of strap 201 pass through notches 202 in the flange of a dish-like disc 203 which is attached to a valve 205 having lands 206 and 207. The upper end of valve 205 is press-fitted into the inner race of a ball bearing 208, the outer race of which is press-fitted into a cup 209 which receives the lower end of governor control spring 210, the upper end of which receives a plug 211 connected by a pin 212 with a lever 213. The forked right end (Fig. 8) of lever 213 is attached by pins 214 to a nut 215 through which a screw 216 is threaded, said screw being supported by an extension of housing 176. By turning the screw 216, the nut 215 and the fulcrum pins 214 are raised and lowered for purposes of adjustment. The screw 216 is retained in adjusted position by a bushing 217 having (attached to frame 176 by screws 217a) a radially serrated flange 219 of screw 216. When screw 216 is turned, it is carried downwardly by reason of the coaction of the serration, downward movement being resisted by spring 210 which urges the screw 216 upwardly to reengage the serrations after the screw has been adjusted.

The adjustment of fulcrum pin 214 provides for adjustment of the left end of lever 213 relative to a cam 220 which operates the lever. Cam 220

(Fig. 8) is attached to a shaft 221 supported with a tubular shaft 222 not connected therewith and by a bearing 223 attached to the housing. Shaft 221 is provided with a groove 224 receiving a screw pin 225 in order that the shaft 221 will be retained in position. Shaft 221 is connected with a lever 226 providing a socket 227 for receiving a spring 228 bearing against the flange 229 of a rod 230 having a knurled head 231. As shown in Fig. 1, the rod 231 is adapted to be received by any one of a series of holes 232 located upon an arcuate centerline concentric with the axis of shaft 221. Each of the holes 232 represent a particular speed for which the governor is set. The cam 220 is located between spacer sleeves 234 and 235. Since at least a part of the governor is immersed in hydraulic fluid it is desirable to prevent churning of the fluid by the governor as much as possible. To minimize churning or foaming, the governor is enclosed by a sheet metal like shroud 236 secured to the plate 193 by screws 237 and nuts 238.

Valve 205 is received by a sleeve valve 240 which provides ports 241 connected with annular groove 242 communicating with ports 243 connected with groove 244 of sleeve 190. Land 207 of valve 205 controls ports 247 and 248 of valve 240 connected with annular groove 249 always connected with ports 250 of sleeve 190 connected with annular groove 251 of said sleeve. A valve guide sleeve 260 (Figs. 6 and 11) is received by bore 261 in the housing 176 and retained therein by a plate 191 which is shaped to fit into an annular groove 262 of the sleeve 260. Sleeve 260 receives a valve 263 having lands 264 and 265. Land 265 controls ports 266 and 267. Ports 266 and 267 in sleeve 260 are connected with annular groove 268. Sleeve 260 provides holes 269 connected with annular groove 269'.

A stabilizer cylinder 270 (Fig. 4) is received by a socket 271 of housing 176 and sealed by ring 272. Cylinder 270 is provided with an internal groove 273 connected by holes 274 with the interior of the cylinder. The upper end of the cylinder is closed by a cap 275 sealed by ring 276. Cylinder 270 receives a piston 277 connected with a rod 278. The piston rod 278 is connected by a lever 279 with a cam 280 having a slot 281 which receives a pin 282 fixed to a bar 283 having a notch 284 (Fig. 5) which receives the cam 280. The bar 283 is adjustable horizontally in Fig. 5. For this purpose it is provided with screw threads 285 engaged by a nut 286 having a flange 287 by which screws 288 may attach it to the housing 176. By removing the screws 288, the nut 286 can be turned upon the screw 285, thus making an adjustment of the position of the bar 283 when the nut 286 is again attached to the housing. In this manner the relation of the pin 282 to the slot 281 of the cam 280 can be changed thereby changing the eccentricity of the cam 280 relative to the pin 282. As shown in Fig. 4 the pin 282 is substantially concentric relative to the contour of the cam 280. By adjusting the rod 283, the amount of movement transmitted from the piston 278 by the cam 280 to a cam follower plate 290 can be varied. Adjustment of pin 282 relative to piston rod 278 and valve 240 changes the ratio of the lever arms of these parts with respect to the pin and changes the degree of stabilization or stabilization sensitivity constant of the stabilizer which includes the piston 277. Cam follower plate 290 (Fig. 5) provides a hole 291 for loosely receiving a pin 292 attached to the housing. A pin 293 passes through a washer 294 retained by pin 295 and then through a spring 296 and then through the plate 290 and then into the housing. The spring 296 serves to maintain the plate in contact with fulcrum studs 297 and 298 carried by the housing. The plate 290 is caused to follow the cam 280 by reason of engagement of valve 240 with plate 290 said valve being urged downwardly by leaf spring 300 (Fig. 4). Therefore the spring 300 forces the plate 290 down against cam 280 while the spring 296 urges the plate 299 against the fulcrum studs 297 and 298. In this way movement of piston rod 278 effects movements of the valve 240 and the plate 290 which rocks about a line V—W (Fig. 5) which crosses the ends of the studs 297 and 298. As shown in Fig. 6, plate 290 is engaged by valve 263 which is urged downwardly by spring 263a. The amount of motion imparted by the plate 290 to the valve 263 will depend on the amount of movement imparted by the cam 280 to the plate 290 and also will depend on the perpendicular distance from the center line of valve 263 to the line V—W (Fig. 5). The throw of the valve 263 can be changed by changing the position of the fulcrum stud 298, for example, to the position 298'. In such case, the plate would rock on the line X—Y, Fig. 5. Because the basic time constant of the governor is a function of the ratio of the lever arms of valve 263 and cam 280 with respect to the fulcrum represented by line V—W or line X—Y, change in location of the fulcrum will cause a change in the basic time constant. This change can be made without changing the degree of stabilization or the stabilization sensitivity constant of the stabilizer. For the purpose of this adjustment, the housing would be provided with a plurality of holes, each for receiving the stud 298.

Gear 188, Figs. 4, 7 and 6 drives a gear 300 which operates a pressure pump P comprising gears 301 and 302 driven by gear 300 and confined in a housing provided by plates 303, 304 and 305. This housing provides an inlet 306 connected with the hydraulic fluid within the housing 176. Plate 305 provides an outlet 307 connected by a passage 308 in housing 176 with a cylindrical bore 309 therein which receives a sleeve 310 retained in the bore 309 by a plate 311 attached to the housing 176 by screws 312. The sleeve provides a groove 313 connected with a reservoir in the housing, said groove being connected by ports 314 with a cylinder 315 provided by the sleeve, said cylinder receiving a piston 316 having a rod 317, the upper end of which terminates in a notched dashpot disc 318. Between the sleeve 310 and the disc 318 is located a spring 319, tending to urge the piston valve 316 up to close the ports 314. When oil pressure in the bore 309 and cylinder 315 exceeds a certain amount, the piston 316 which serves as a pressure control valve moves down to open the ports 314 and thus limits the pressure in passage 308 and also in the passage 320 connected with the bore 309.

Referring to Fig. 10, a cylinder 321 is received by a socket 322 provided by the housing. Cylinder 321 receives a piston 323 having a rod 324 which extends through a cover 325. Rod 324 carries a pin 326, Fig. 9, received by notches 327 in the arms 328 of a lever 329 connected by a key 330 with shaft 222. Shaft 222 is supported by a bearing 331 in the housing 176 and is connected with a lever 332 by which the connection may be made to the engine throttle. In order that this connection may be be adjustable, lever 332 is provided with a slot for receiving a pin not shown, which can be located at different distances from the axis of the shaft 222.

Figure 2:
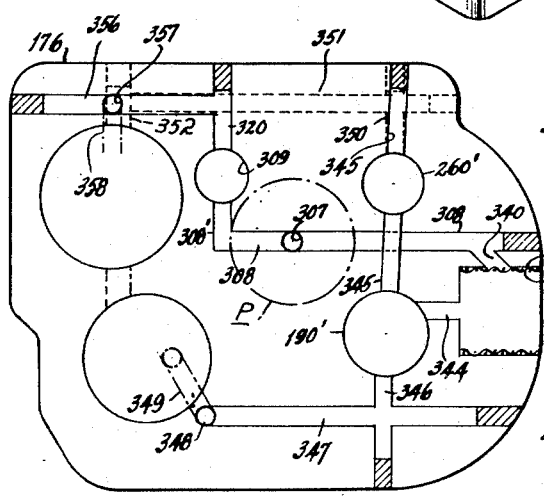
Figs. 2 and 3 are diagrams of fluid passages of the governor.
Figure 3:
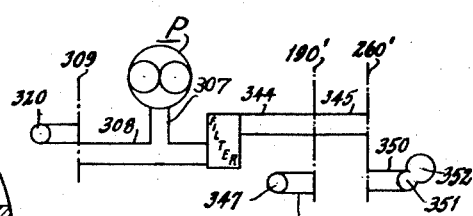

The various ducts connecting the pump valves and cylinders will now be explained particularly with reference to Figs. 2 and 3. The bore 308 in housing 176 connects with pump outlet 307. Bore 308 is connected by bore 340 with bore 341, Fig. 4, receiving a filter 342 having a flange 343 attached to the housing 176 by screws 343a. The interior of the filter is connected by bore 344 with the bore 190' which receives the sleeve 190 of Fig. 4. Bore 345 connects bore 190' with the bore 260' which receives the sleeve 260 of valve unit 110. Groove 251 of sleeve 190 (Fig. 4), is connected by a bore 346 connected with a bore 347 connected with a vertical bore 348 (Fig. 10), connected with a passage 349 in cap or cover 275, said passage leading to the upper end of cylinder 270. Groove 268 of unit 110' (Fig. 11), is connected with bore 350 connected with a bore 351 (Fig. 2) connected with bore 352 (Fig. 10) in alignment with hole 353 of cylinder 321, said cylinder having a hole 354 in alignment with a bore 355 (continuation of 352). Bore 355 is connected with groove 273 of cylinder 270, connected with the lower end of the cylinder through passages 274. The pump is connected with the upper end of cylinder 321 through bores 308 and 308' (Fig. 2), bore 309, bore 320, bore 356, vertical bore 357 (Fig. 10) and passages 358 in cover 325 leading to the upper end of cylinder 321.

In Fig. 12, pipe 356 represents the chain of ducts (Fig. 2) 358, 357, 356, 320, 308', 308 which connect the upper end of cylinder 321 (Fig. 10) with the pump P (Fig. 6). In Fig. 12, pipe 344 represents the chain of ducts 308, 340, filter 342, ducts 344, 345 (Fig. 2) connecting the pump P and the valve sleeve 260. In Fig. 12, pipe 351 represents the chain of ducts 353, 352, 351 (Fig. 10) and 350 (Fig. 2) connecting the lower end of cylinder 321 with groove 268 (Fig. 11) of valve sleeve 260. Pipe 345 represents duct 345 (Fig. 11) connecting groove 269' of sleeve 260 with groove 244 of sleeve 190. In Fig. 12, pipe 347 connecting groove 251 with the upper end of cylinder 270 represents ducts 346, 347 (Fig. 11) and ducts 347, 348 and 349 (Figs. 2 and 10).

When the governed speed is being maintained, the pistons 277 and 323 of cylinders 270 and 321 are substantially stationary. There will be of course minute vibration of the valves 205 and 263, thereby providing enough leakage of pressure fluid around the valve lands and through ports to provide the pressures required to hold the pistons 277 and 323 substantially stationary. A practically constant pressure is applied to the upper side of piston 323 through pipe 356. When there is equilibrium, piston 323 is balanced between the pressures above and below; and the piston 277 is balanced between the pressures above and below it. By relieving the pressure above piston 277, the pressure below piston 323 is relieved. Pressure below the piston 323 can be relieved also by bleeding the pipe 351. Thus by two routes fluid can escape from the lower end of cylinder 321. In consequence, piston 323 descends as piston 277 ascends and as fluid escapes from pipe 351 at port 266. Conversely by causing pressure above piston 277 to increase and overbalance the pressure below the piston, piston 277 moves down to force fluid through the pipe 355 to increase the pressure below piston 323. Pressure below piston 323 may be increased also by causing a flow through pipe 351 into cylinder 321. Thus two routes or paths are provided for causing flow of fluid into the bottom of cylinder 321 to raise the piston 323.

In case of underspeed error, valve 205 moves downwardly to uncover port 247 whereupon flow of pressure fluid from pump P into the upper end of cylinder 270 causes the piston 277 to move down and the piston 323 to move up. Downward movement of piston 277 causes downward movements of valves 240 and 263. Since the rate of flow into the upper end of cylinder 270 is controlled jointly by valves 205 and 240, the piston 277 will move down at a rate in proportion to $\dot{n}$, the rate of change of speed error. As piston 277 moves down, fluid is forced through pipe 355 into the lower end of cylinder 321, causing piston 323 to move up. Its rate of movement due to downward movement of piston 277 will be in proportion to the rate of change of speed error. While this is going on, the valve 263 is moving down to uncover ports 267, 278, thereby connecting pump P with pipe 351 and the lower end of cylinder 321. Valve 263 moves down an amount in proportion to the amount of speed error; hence, the flow from pump P to the lower end of cylinder 321 occasioned by the downward movement of valve 263, will be at a rate in proportion to speed error. Therefore, in consequence of downward movement of piston 152 and downward movement of valve 263, the rate of flow of pressure fluid into the lower end of cylinder 321 will be in proportion to speed error and to the rate of change of speed error. Therefore throttle valve 20 will move up in a valve body 21 at a rate in proportion to speed error and to the rate of change of speed error in order to permit a greater flow (indicated by arrows 22 and 23) of operating medium to the prime mover whereby the governed speed will be attained in the minimum time and the valves 205, 240 and 263 will be returned to equilibrium status.

In the event of over-speed error, valve 205 moves up to uncover port 248 of valve 240, thereby connecting the upper end of cylinder 270 with drain through pipe 327, port 248 and a drain hole 240a of valve 240. Since the flow from the upper end of cylinder 270 is under joint control by valves 205 and 240, this flow to drain will be at a rate in proportion to the rate of change of speed error. The flow of pressure fluid from the upper end of cylinder 270 is produced by upward movement of piston 277 which moves up due to the fact that, when the pressure in the upper end of cylinder 270 is relieved, the pressure in the upper end of cylinder 321 becomes effective to push piston 323 down to displace fluid in the lower end of cylinder 321, causing fluid to pass through pipe 355 to the lower end of cylinder 270. Therefore, due to the control of port 248 by valves 240 and 205, piston 277 moves down and causes piston 277 to move up an amount in proportion to the amount of speed error. As piston 277 moves up, valve 263 moves up to uncover port 266, thereby connecting pipe 351 with drain. Since the flow rate through port 266 is in proportion to the amount of speed error, some of the fluid in the lower end of cylinder 321 will escape to drain at a rate in proportion to the amount of speed error. Therefore, piston 323 moves down at a rate in proportion to the rate of flow through pipe 355 to the bottom of cylinder 270 which is in proportion to the rate of change of speed error and also through the pipe 351 at a rate which is in proportion to the amount of speed error. Therefore, piston 323 and valve 20 move down at a rate in proportion to the amount of speed error and to the rate of change of speed error and the flow of operating medium to the prime mover will be decreased to correct the speed error in a manner such that equilibrium will be established in the minimum time; and the valves 205, 240 and 253 will return to equilibrium status.

The degree of stabilization effected through movement of piston 277 is determined by the amount of displacement of piston 277 required to move the follow-up valve 240 into position causing its ports 247, 248 to be closed by land 207. Degree of stabilization increases as the amount of displacement of piston 277 for this purpose increases. In other words, if the movement of valve 240 is smaller in proportion to movement of piston 277, the degree of stabilization is greater than when the movement of valve 244 is greater in proportion to movement of piston 277. Therefore the closer pin 282 is to the vertical center line of valve 240 the greater is the degree of stabilization. Adjustment of pin 282 to the right of the position shown in Fig. 12 decreases the degree of stabilization.

While the embodiments of the present invention as herein disclosed, constitute preferred forms, it is to be understood that other forms might be adopted, all coming within the scope of the claims which follow.

What is claimed is as follows:

1. An engine governor comprising an hydraulic servo including a first cylinder and piston therein having greater area on one side than on the other exposed to fluid pressure, a pressure fluid reservoir, a pump having its inlet connected with the reservoir, a duct directly connecting the outlet of the pump with the first cylinder end in which the piston side of lesser area is exposed whereby said piston side is continually subjected to a substantially constant total pressure to oppose pressures to which the larger area side of the piston is subjected, a governing member connected with the piston for movement to correct for overspeed or positive speed error when the total pressure on the large area side of the piston is less than the total pressure on the smaller area side of the piston and, vice versa, to correct for underspeed or negative speed error when the total pressure on the larger area side of the piston is greater than the total pressure on the smaller area side of the piston, two ducts connected with the end portion of the cylinder in which the piston side of larger area is exposed, a second cylinder, a piston movable therein, said cylinder being connected at one end with one of said ducts, means for connecting the other end of the second cylinder either with the pump outlet or with the reservoir or for blocking flow into or out of said other end of the second cylinder and including two cooperating valves, an engine speed responsive device for controlling one of the valves, a mechanism operated by the second piston for operating the other of said valves as a follow-up valve, means for connecting the other of said ducts either with the pump outlet or with the reservoir or for blocking flow into or out of said other duct and including a third valve and means under control by the speed responsive device for positioning the third valve.

2. A governor according to claim 1 in which one of the two cooperating valves is a spool valve operated directly by the speed responsive device and the other of said valves is a sleeve valve within which the spool valve is slidable and which provides a passage to the reservoir and a port communicating with the pump outlet and a port for connecting the said other end of the second cylinder either with the first port of the sleeve valve or with its passage to the reservoir, said spool valve having a land for controlling the second port of the sleeve valve.

3. A governor according to claim 1 in which means under control by the speed responsive device for positioning the third valve is a mechanism operated by the second piston and including a lever operatively connected with the third valve.

4. A governor according to claim 1 in which one of the two cooperating valves is a spool valve operated directly by the speed responsive device and the other of said valves is a sleeve valve within which the spool valve is slidable and which provides a passage to the reservoir and a port communicating with the pump outlet and a port for connecting the said other end of the second cylinder either with the first port of the sleeve valve or with its passage to the reservoir, said spool valve having a land for controlling the second port of the sleeve valve and in which the mechanism operated by the second piston includes a lever operatively connected with the second piston and the sleeve valve.

5. A governor according to claim 1 in which one of the two cooperating valves is a spool valve operated directly by the speed responsive device and the other of said valves is a sleeve valve within which the spool valve is slidable and which provides a passage to the reservoir and a port communicating with the pump outlet and a port for connecting the said other end of the second cylinder either with the first port of the sleeve valve or with its passage to the reservoir, said spool valve having a land for controlling the second port of the sleeve valve and in which the mechanism operated by the second piston includes a lever operatively connected with the second piston and the sleeve valve, and in which means under control by the speed responsive device for positioning the third valve includes a second lever operatively connected with the first lever and with the third valve.

6. A governor according to claim 1 in which one of the two cooperating valves is a spool valve operated directly by the speed responsive device and the other of said valves is a sleeve valve within which the spool valve is slidable and which provides a passage to the reservoir and a port communicating with the pump outlet and a port for connecting the said other end of the second cylinder either with the first port of the sleeve valve or with its passage to the reservoir, said spool valve having a land for controlling the second port of the sleeve valve and in which the mechanism operated by the second piston includes a lever operatively connected with the second piston and the sleeve valve, and in which means are provided for adjusting the fulcrums of said levers.

7. An engine governor comprising a housing providing a reservoir for hydraulic fluid and having a partition wall separating the interior of the housing into upper and lower chambers, a first cylinder within said wall, a first piston in said cylinder, a first piston rod extending upwardly from the first piston and into the upper chamber, means for connecting the first piston rod with an element to be controlled, a second cylinder within said wall, a second piston within the second cylinder and a second piston rod extending from the second piston downwardly into the lower chamber, a pump within the wall, a rotatable flyweight device supported by the wall in the upper chamber, an engine driven shaft supported by the wall, gearing connecting the shaft with the pump and device, a spool valve having spaced lands and connected for longitudinal movement with the device, a sleeve valve enclosing the spool valve and supported for longitudinal movement by the wall, and providing a passage to the lower chamber and a first port for the intake of pressure fluid and a second port for connecting the upper end of the second cylinder with said passage of the sleeve valve or with the intake port, said second port being controlled by a land of the spool valve, a third spool valve having spaced lands and supported for longitudinal movement by the wall, a fixed sleeve within the wall and enclosing the third valve and having a first port for the intake of pressure fluid and a second port for making a connection between the lower end of the first cylinder and either with the first port of the second sleeve or with the reservoir, said second port of the fixed sleeve being controlled by a land of the third valve ducts in the wall respectively for connecting the reservoir and pump inlet, for connecting the pump outlet with the first or intake port of the sleeve valve, with the first or intake port of the fixed sleeve, and with the upper or piston rod end of the first cylinder, for connecting the lower ends of the cylinders, and for connecting the upper end of the second cylinder with the second port of the sleeve valve, and mechanism in the lower chamber for transmitting motion from the second piston rod to the sleeve valve and to the third valve.

8. An engine governor according to claim 7 in which the mechanism last mentioned comprises a first lever having one of its ends connected with the second piston rod, having an intermediate portion operatively connected with the sleeve valve, a fulcrum for the other end of the lever supported by the housing, and comprises a second fulcrum provided by the housing and a second lever operated by the first lever and operatively connected with the third valve.

9. An engine governor according to claim 7 in which the mechanism last mentioned comprises a first lever having one of its ends connected with the second piston rod, having an intermediate portion operatively connected with the sleeve valve, a fulcrum for the other end of the lever supported by the housing, and comprises a second fulcrum provided by the housing and a second lever operated by the first lever and operatively connected with the third valve and in which means exterior to the housing are provided for adjusting the position of the fulcrum of the first lever.

CLIFFORD L. MUZZEY.
HOWARD CARSON.

REFERENCES CITED

The following references are of record in the file of this patent:

UNITED STATES PATENTS

| Number | Name | Date |
|---|---|---|
| 1,810,627 | Standerwick | June 16, 1931 |
| 1,899,556 | Caughey | Feb. 28, 1933 |
| 1,933,311 | Caughey | Oct. 31, 1933 |
| 1,941,372 | Warner | Dec. 26, 1933 |
| 1,966,225 | Standerwick | July 10, 1934 |
| 1,976,659 | Dickinson | Oct. 9, 1934 |
| 2,197,743 | Crafts | Apr. 16, 1940 |
| 2,328,451 | Hedman | Aug. 31, 1943 |
| 2,333,454 | Van Nest | Nov. 2, 1943 |
| 2,358,894 | Volet | Sept. 26, 1944 |

FOREIGN PATENTS

| Number | Country | Date |
|---|---|---|
| 598,520 | Germany | June 12, 1934 |